July 3, 1923.
F. K. LAWRENCE
1,460,592
CARRIER FOR SPARE WHEELS AND THE LIKE
Filed May 12, 1921    3 Sheets-Sheet 3
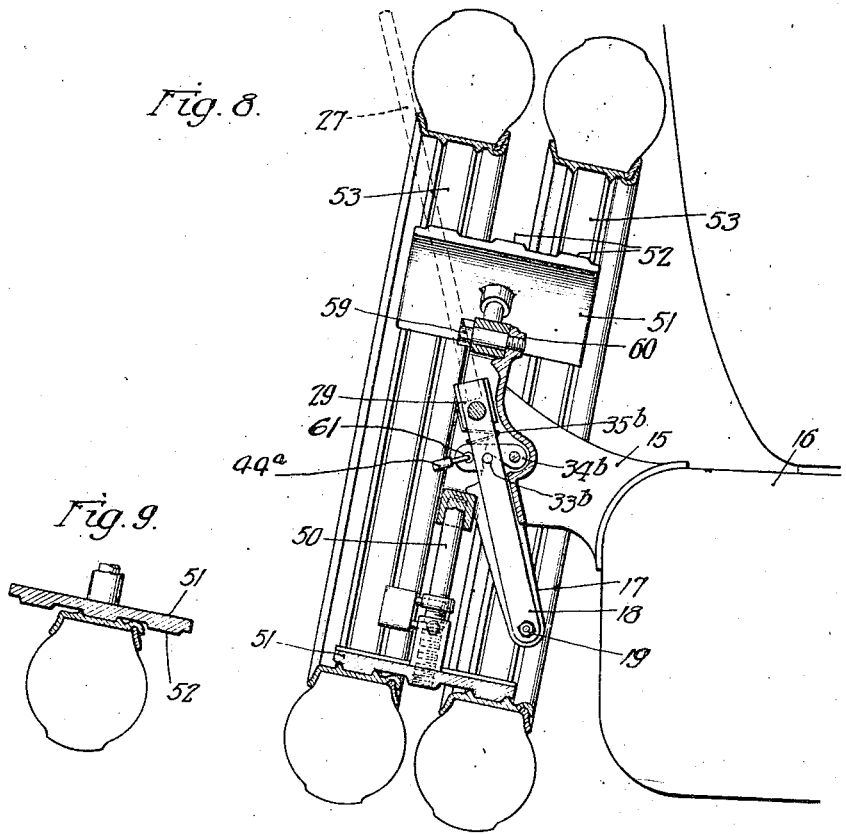
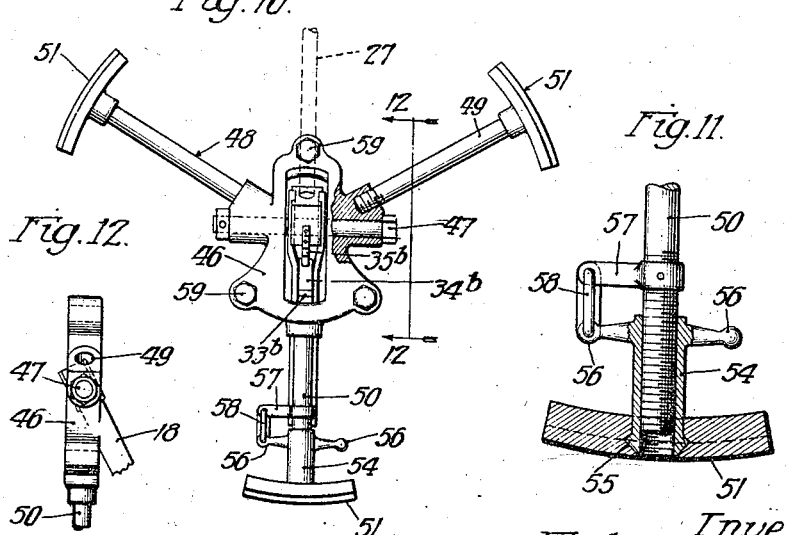
Inventor.
Frederick K. Lawrence
By Cheever & Cox
Attys Patented July 3, 1923.

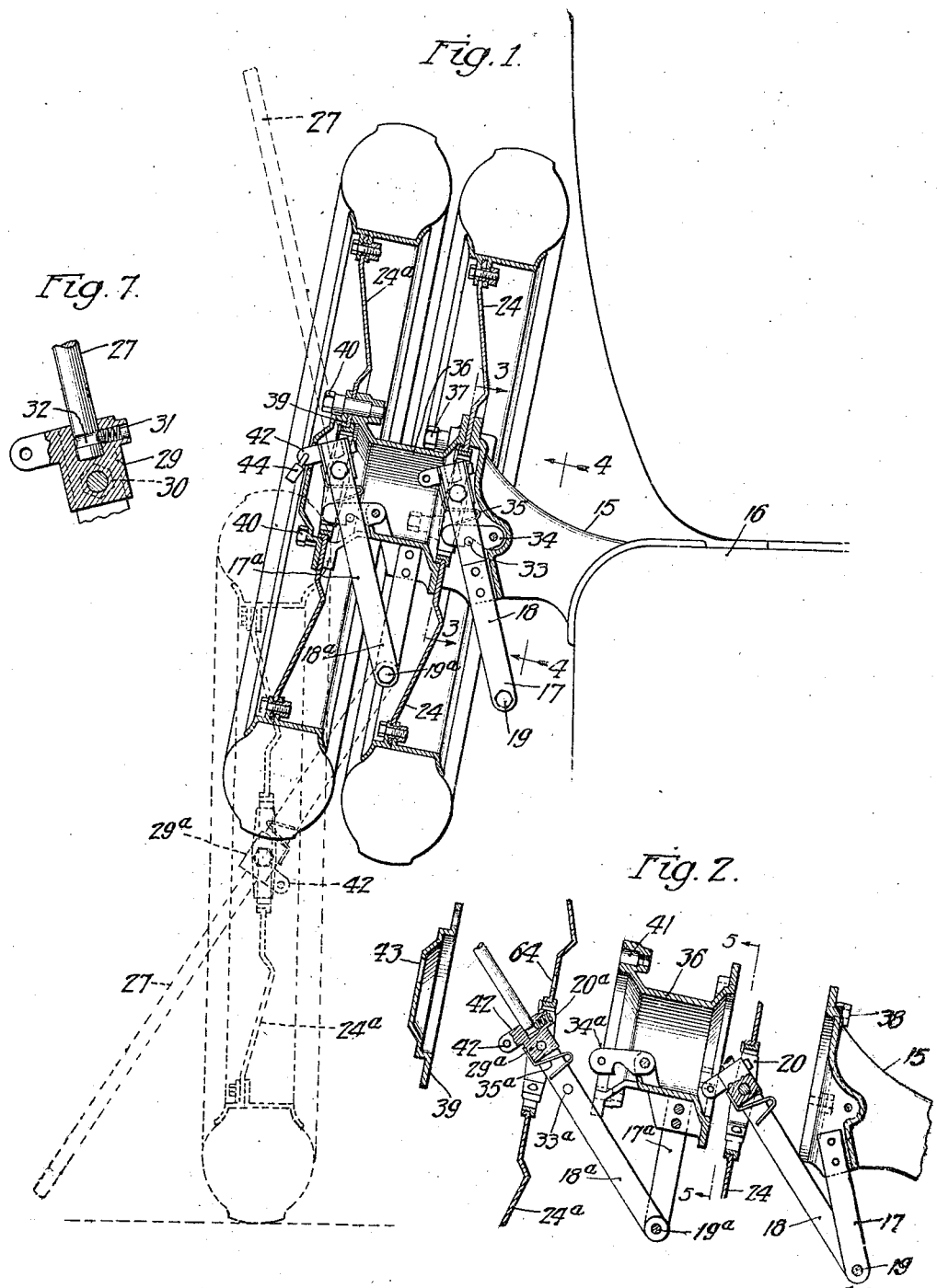

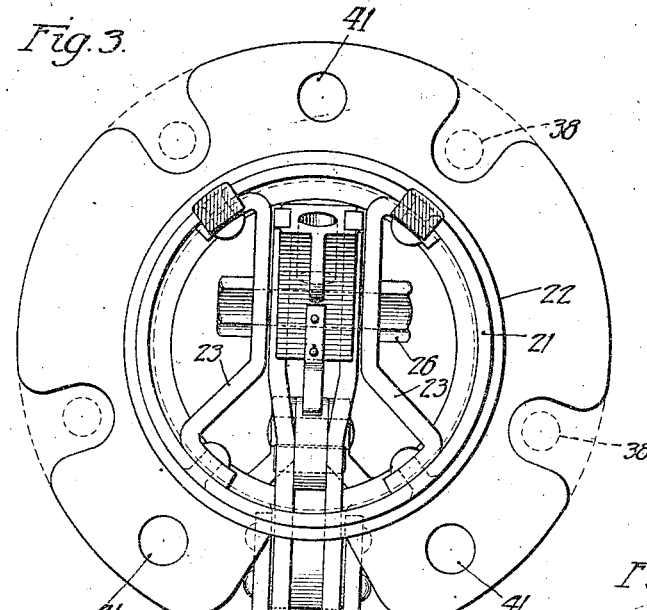
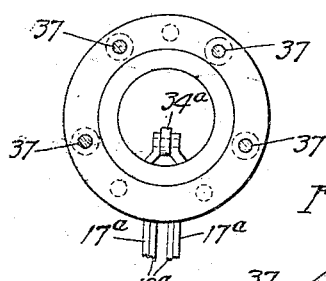
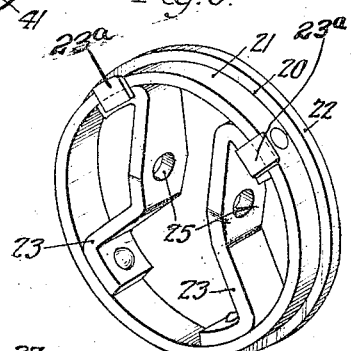
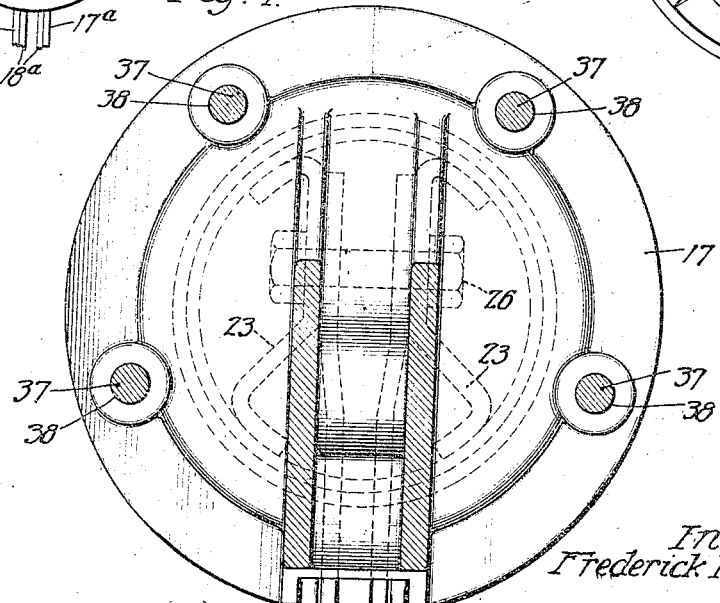

1,460,592

UNITED STATES PATENT OFFICE.

FREDERICK K. LAWRENCE, OF CHICAGO, ILLINOIS, ASSIGNOR, BY DIRECT AND MESNE ASSIGNMENTS, TO SELF-MOUNTING CARRIER COMPANY, OF WILMINGTON, DELAWARE, A CORPORATION OF DELAWARE.

CARRIER FOR SPARE WHEELS AND THE LIKE.

Application filed May 12, 1921. Serial No. 468,885.

*To all whom it may concern:*

Be it known that I, FREDERICK K. LAWRENCE, a citizen of the United States, residing at Chicago, in the county of Cook and State of Illinois, have invented a certain new and useful Improvement in Carriers for Spare Wheels and the like, of which the following is a specification.

My invention relates to apparatus for lifting and supporting wheels, rims, tires, or the like, more particularly for carrying the spare wheels and rims of motor vehicles.

The general object of the invention is to provide a lifting mechanism having a simple form of force multiplying mechanism whereby the tire and its mounting may be readily raised from the ground to running position or lowered to the ground from running position. In the illustrated form I have obtained this object by employing a lever of the second class which is pivoted to the vehicle and carries the wheel at a point between the pivot and the lever handle. Another object is to provide a stationary stop or holder upon which the wheel will be supported when in traveling position and to so locate the lever pivot that the lever will be able to raise the wheel from the ground directly to the holder without requiring shifting of the wheel along the lever during the raising or lowering operation.

A further object of my invention is to provide an improved construction by which a plurality of wheels or rims can be supported and easily lowered to the ground and released from engagement with the lifting apparatus.

A still further object is to provide means whereby when the articles are raised to their supported positions they are automatically secured in place and can then be locked securely to the supporting apparatus.

The invention is shown for the purposes of illustration attached to a vehicle and carrying automobile tires and wheels, but it is also adapted to be fastened to a wall or the like of a garage, store room or a display room and used for lifting and supporting automobile tires and wheels and other heavy articles.

The invention consists in the novel constructions, arrangements and devices for carrying out the above stated objects and such other objects as will appear from the following description of certain preferred embodiments illustrated in the accompanying drawings, wherein—

Figure 1 is an assembly view from the side of the vehicle showing the apparatus mounted on the vehicle;

Figure 2 is a sectional view of the various parts of the apparatus adapted for supporting two wheels in which the parts are shown partially assembled;

Figure 3 is an enlarged view taken at the line 3—3, Figure 1;

Figure 4 is an enlarged sectional view taken on the line 4—4, Figure 1;

Figure 5 is a view taken along the line 5—5, Figure 2;

Figure 6 is an enlarged perspective view of the supporting device;

Figure 7 is an enlarged sectional view showing the method of securing the lever extension in its operative position;

Figure 8 is an assembly view from the side of the vehicle showing an alternative embodiment of the apparatus mounted on the vehicle;

Figure 9 is a fragmentary sectional view of one of the arms illustrated in Figure 10 showing a single tire mounted in the center of the apparatus;

Figure 10 is a view of the embodiment shown in Figure 8 without the tires and taken at an angle of 90° therewith;

Figure 11 is an enlarged partial sectional view of the extensible arm shown in Figure 10; and Figure 12 is a view taken along the line 12—12 of Figure 10.

Like numerals denote like parts throughout the several views.

Referring first to Figures 1 to 7 of the drawings, which show the invention in a form particularly adapted for disc wheels, it will be seen that the apparatus is shown supported by a bracket 15 or wheel holder mounted on the rear end of an automobile body 16. The holder 15 has a downward projection 17 on which a lever 18 is pivotally supported by a bolt 19. Pivotally supported on the lever 18 is a seat 20 which is adapted to support the spare wheel. This is shown in perspective in Figure 6 and comprises a ring 21 having a shoulder 22 and a pair of supporting bars 23 riveted to ring 21. This device is adapted to fit into the center opening of a disc wheel 24 and has lugs 23ᵃ for engaging the inner rim of the wheel and preventing it from slipping off the seat during raising or lowering. The bars 23 have holes 25 slightly above the center of the seat adapted to receive a bolt 26 which passes through the lever 18 and carries the entire weight of the seat and wheel when they are being raised or lowered. As the bolt 26 is above the center of gravity of the seat and the wheel, the latter tends to hang pendant at all times during the movement of the lever 18 during raising and lowering. The lever 18 is made extensible by means of a rod 27 which is adapted to be inserted into a socket member 29 which is fastened at the outer end of the lever 18 by a bolt 30 as shown in detail in Figure 7. A spring pressed pin 31 enters a groove 32 in the rod 27 permitting easy removal of the rod from engagement with the lever 18. It will be evident that the elements 18 and 27 form a lever of the second class.

A pin 33 is fastened to lever 18 and is adapted to be engaged by a latch 34 as it moves upward to acting position, shown in Figure 1. A spring 35 backs up the latch and thus tends to yieldingly hold it in engagement with the pin.

My apparatus is designed to be used either in single or multiple form, that is, it may be arranged to support a single article or a plurality of wheels or rims. The parts thus far described are capable of supporting a single disc wheel and the manner of operation is as follows: when it is desired to apply a spare wheel, the lever 18 is lowered, either with or without the aid of the supplemental rod or handle 27. Then the wheel is rolled along the ground until it is opposite to the apparatus. As the center of gravity of the seat 20 is lower than the axis of bolt 26, the device tends to hang vertical during all positions of the lever and hence presents itself in proper position to have the disk wheel applied. This is done by passing the hub opening of the wheel over the ring 21. When this has been done the operator inserts the handle 27 and with its assistance swings lever 18 upward until the pin 33 slips under latch 34 and is finally engaged by it. As the center of gravity of the combined weight of the wheel, tire and seat 20 is below bolt 26, the wheel during the raising action will tend to maintain a vertical position with the result that when it is fully raised, the disc may be readily brought into contact with the holder 15. The handle 27 may then be withdrawn from the socket 29 and the wheel will remain in place. The wheel is then secured for traveling by applying a cap 39 and then passing bolts through it and the bolt holes in the wheel and screwing them into the holes 38 in the flange of the holder 15. Of course, when it is desired to lower the wheel the reverse of this operation is performed, the operator lifting latch 34 to release the lever 18, and the wheel and tire being lowered by the aid of handle 27.

In case it is desired to support a second spare wheel, supplemental mechanism is employed, one of the chief elements of which is part 36. This is a frame which in the present form is in the shape of a spool 36 shown at the middle portion of Figures 1 and 2. It is fastened to the outer face of the wheel by means of bolts 37 which are inserted through holes in the rear flange of part 36, and the usual holes 64 provided in the wheel for bolting it to the hub of the motor vehicle. The bolts 37 then are screwed into holes 38 provided in the flange of the holder or bracket 15. Thus the first wheel lies between holder 15 and the part 36.

Frame 36 is provided with substantially the same mechanism as is provided for holder 15, viz: an arm 17ᵃ fastened to the frame and supporting a pivot 19ᵃ which forms a fulcrum for a second lever 18ᵃ. A device 20ᵃ, similar to the device 20, is mounted on the lever 18ᵃ and supports a second disc wheel 24ᵃ. A pin 33ᵃ, a latch 34ᵃ and a spring 35ᵃ automatically engage and secure the lever 18ᵃ when it is elevated to its carrying position.

Cap 39 is fastened to the outer end of the frame 36 by means of bolts 40 which are inserted through holes 41 in the spool-shaped member and corresponding holes 64 in wheel 24ᵃ and the cap member 39 thereby securely holding the device 20ᵃ in its carrying position. A socket member 29ᵃ similar to the socket member 29 is mounted on the outer end of the lever 18ᵃ and carries a lug 42 adapted to penetrate a slot 43 in the cap member 39. The hasp of a padlock 44 can be inserted in a hole 45 in the lug 42 thereby securely locking the apparatus in its carrying position.

If it is desired to carry only one wheel, the cap 39 is substituted for the frame 36 and it and the wheel bolted to the holder 15 as above described. The parts can be locked by a padlock in a manner similar to the locking of lever 18ᵃ.

From the foregoing it will be seen that my apparatus is capable of carrying a single spare wheel or any number of them, additional wheels being accommodated by simply adding supplemental frames 36 after the previous wheel has been put in place.

Figures 8 to 12 illustrate an alternative embodiment of my apparatus adapted for carrying either one or two demountable rims and tires. A spider 46 is pivotally mounted on the lever 18 by a bolt 47. Radially extending spokes 48, 49 and 50 are mounted on the frame 46 and each carries at its outer end a segmental felloe 51 having three projections 52 on the outer surface adapted to engage the inner periphery of the rim 53 of an automobile wheel. These are symmetrically placed so that the center of gravity of the loaded device will always come approximately at the central plane whether two rims are in place or only one. When only one is to be carried it is placed at the center of the felloe, as shown in Figure 9. When two are to be carried, they are mounted as shown in Figure 8.

The spoke 50 is made extensible by being threaded through a sleeve 54 shown in detail in Fig. 11. This sleeve which has a swivelled mounting 55 in its felloe 51 thereby permitting the sleeve to be turned relative to the felloe and adjusted longitudinally of the spoke. Projections 56 are provided on the sleeve so that it can be easily turned by hand. An arm 57 is rigidly fastened to the spoke 50 and has pivotally mounted on its outer end a locking clip or keeper 58 which engages either of the members 56 and locks the sleeve in any desired position.

To operate the modified form of device, the lever and spider are lowered and the rim or rims are positioned on the felloes 51 and the sleeve 54 turned until the felloes closely engage the inner periphery of the rims, when they are locked in place by pushing the link 58 into engagement with the hand piece 56. In elevating the apparatus the catch 33b, latch 34b and spring 35b automatically operate to hold the apparatus in its carrying position. The apparatus is secured in its carrying position by bolts 59 which are screwed into threaded holes 60 in the holder 15. The latch 34b which is positioned between the parts of the lever 18 projects past the lever sufficiently to enable the hasp of a padlock 44a to be inserted in a hole 61 in the latch, thereby securely locking the apparatus in its elevated position.

It is evident that the underlying principle of the invention, broadly considered, is not affected by the presence or absence of the web portion of the wheel. Consequently in the appended claims the term "wheel" is to be interpreted as covering merely a demountable rim and tire or a rim with the addition of the web or disc portion of a so-called "disc" wheel.

It will be evident that in my device there is a seat 20 for supporting the tire mounting upon a lever of the second class, and that the seat engages the tire mounting in such manner as to prevent it from shifting along the lever; also that there is a stop 15 for limiting the upward movement of the seat and that it forms a holder for supporting the wheel when traveling; also that the lever is pivoted far enough below the holder to cause the seat to swing up until it is coaxial with the holder, that is, in position to register or cooperate with it. It will also be evident that the lever taken as a whole projects through the center or hub opening of the wheel and swings from a position obliquely downward when the tire is on the ground to a position obliquely upward when the tire is in traveling position. It will also be observed by reference especially to the dotted line position shown in Figure 1 that as ordinarily mounted on the vehicle the height of the fulcrum or pivot 19 and the length of the rigid member 18 between fulcrum 19 and seat 20 are such that when the tire is lowered to the ground the axis of the wheel will be almost as far below the fulcrum 19 as it is above it when the wheel is in traveling position on the holder 15. One result is that in moving from lowered to raised position said rigid member swings through an arc of nearly 180 degrees, that is, from an appropriately downright position to an approximately upright position, thus obtaining a maximum range of lift with a minimum distance between the seat and the fulcrum. Another result is that when the wheel is in elevated position and about to be secured to the holder 15 the rigid element 18 (being then in approximately upright position) will carry the weight of the tire and its mounting with comparatively little effort on the part of the operator or comparatively little strain on the self locking latch 34.

Having thus described my invention what I claim as new and desire to secure by Letters Patent is:

1. Lifting mechanism for spare tires and their mountings having a holder on the vehicle for supporting the tire mounting, an arm pivoted to the vehicle and adapted to raise the tire from the ground to the holder, and a seat for engaging the tire mounting, said seat being mounted directly on said arm and being adapted to prevent the tire mounting from shifting in either direction along the arm.

2. Lifting mechanism for supporting spare tires and their mountings having a stationary holder on the vehicle for supporting the tire mounting, a lever of the second class having a stationary support at its inner end, below the holder, a seat mounted directly on said lever between its ends, said seat being adapted to engage the upper portion of the central opening of the tire mounting to enable it to hang vertically during raising and lowering, and said seat having means to prevent the tire mounting from shifting in either direction along the lever.

3. Lifting mechanism for a demountable wheel comprising a bar adapted to be inserted through the hub aperture in the wheel, said bar having means for preventing the wheel from shifting along it, means on the vehicle for pivotally supporting the inner end of the bar and permitting it to swing in a vertical plane, and a holder mounted on the vehicle sufficiently above the pivotal supporting means to be substantially coaxial with the wheel when the latter is elevated.

4. Lifting mechanism for spare tires and their mountings comprising a holder on the vehicle adapted to carry the weight of the tire and its mounting during travel, and a rigid member pivoted at one end to the vehicle and having a seat for the tire mounting at a distance from the pivoted end for supporting the tire mounting, said seat being mounted directly on said rigid member and being adapted to engage the upper portion of the central opening of the tire mounting whereby the tire mounting may hang suspended in a substantially vertical plane during raising and lowering, and said seat having means to prevent the tire mounting from shifting along said rigid member, and said rigid member having a handle further from the pivot than said seat, whereby the lifting force exerted by the operator may be multiplied.

5. A lifting carrier for spare wheels and the like having a holder mounted on the vehicle, a rigid element having a seat for the tire mounting, and a stationary fulcrum for said rigid element located as far from the axis of the holder as the distance which said seat is from the fulcrumed end of said rigid element.

6. A lifting carrier for spare wheels and the like having a holder mounted on the vehicle, a rigid element having a seat mounted directly upon it for supporting the tire mounting, and a stationary fulcrum for said rigid element located as far below the axis of the holder as the distance of the seat from the fulcrumed end of said rigid element.

7. A lifting carrier for spare wheels and the like having a holder mounted on the vehicle, a rigid element having a seat for the tire mounting mounted directly upon it, a stationary fulcrum for said rigid element supported by the vehicle as far below the axis of the holder as the seat is from the fulcrum, the fulcrum being as far above the center of the wheel when the latter is upon the ground as the distance of the seat from the fulcrum.

8. A lifting carrier for spare wheels and the like having a holder mounted on the vehicle, a rigid element having a seat for the tire mounting supported by the vehicle as far below the axis of the holder as the seat is from the fulcrum whereby said rigid element will be in upright position when the wheel is in cooperative relation with the holder, and a self locking latch on the holder for locking the rigid member in approximately upright position.

9. Lifting mechanism for spare tires and their mountings having a stationary stop adapted to be mounted on a vehicle for limiting the upward movement of the tire mounting, a fixed pivot mounted at a distance below said stop, a rigid member pivoted on said pivot, a seat mounted directly on said rigid member and located at a distance from said pivot for supporting the tire mounting and preventing it from shifting along said rigid member, and force multiplying means for rotating said rigid member about its pivot.

10. Lifting mechanism for spare tires and their mountings having a stationary stop mounted on the vehicle for limiting the upward movement of the tire mounting, a fixed pivot at a distance below said stop, a rigid member mounted on said pivot so as to swing in a vertical plane, means mounted directly on said rigid member and located at a distance from said pivot for suspending the tire mounting in approximately vertical position during raising and lowering, said means being also adapted to prevent the tire mounting from shifting along said rigid member, and force multiplying means for rotating said rigid member in a vertical plane about its pivot and including a handle located on the opposite side of the plane of the wheel from said pivot.

11. In a carrier for disc wheels for motor vehicles, a bracket adapted to be fastened to the vehicle, said bracket having a flange adapted to contact the wheel disc, a lever having a fulcrum fixed with relation to said bracket, and located below the axis thereof, means on said lever for suspending the wheel and swinging the disc into juxtaposition with the flange of the bracket, and means for securing the wheel to the flange of the bracket.

12. In a carrier for disc wheels, a bracket adapted to be fastened to the vehicle, a lever having a fulcrum fixed with relation to said bracket, means on the lever for suspending the wheel and swinging it into and out of contact with the bracket, a supplemental frame adapted to be fastened to the outer side of the wheel disc when the latter is in contact with the bracket, a lever pivoted to said supplemental frame, and means on said lever for suspending a second wheel and raising it and lowering it with respect to said supplemental frame.

13. Apparatus of the class described comprising a lever having a fulcrum carried by the supporting structure, a seat pivoted to said lever and adapted to engage the internal bearing surface of a disc wheel and the like, whereby said lever and device may be lowered, the wheel positioned on said seat while on the ground, and the lever then raised to carry the wheel into the elevated or supporting position, and means adapted to clamp the wheel to the supporting structure while in its elevated position.

14. A lifting carrier for spare wheels for motor vehicles comprising a flanged member fastened to the vehicle, and adapted to hold the wheel during travel, an extension secured to said flanged member and extending downward therefrom, a lever of the second class pivoted at its inner end to the lower end of said extension and having a handle at its outer end, said lever being adapted to swing from a position obliquely downward to an upright position and having means between its ends for supporting a tire mounting and preventing the latter from shifting along the lever during raising and lowering.

15. A lifting carrier for spare wheels for motor vehicles comprising a wheel holder fastened to the vehicle, an extension secured to said holder and extending downward therefrom, a lever of the second class pivoted at its inner end to the lower end of said extension and having a handle at its outer end, said lever being adapted to swing from a position approximately vertically downward to a position approximately vertically upward, said lever having means between its ends for supporting the wheel and preventing the latter from shifting along the lever during raising and lowering, said means being located on the lever at a distance from the fulcrum equal to the distance of the fulcrum below the axis of the holder, and means for securing the wheel to said holder.

In witness whereof, I have hereunto subscribed my name.

FREDERICK K. LAWRENCE.